United States Patent [19]

Kodron

[11] Patent Number: 4,516,016
[45] Date of Patent: May 7, 1985

[54] APPARATUS FOR RECORDING AND PROCESSING GUEST ORDERS IN RESTAURANTS OR THE LIKE

[76] Inventor: Rudolf S. Kodron, D-6500 Mainz 1, Fed. Rep. of Germany

[21] Appl. No.: 423,004

[22] Filed: Sep. 24, 1982

[51] Int. Cl.³ .............................................. G06K 7/10
[52] U.S. Cl. .................................... 235/472; 235/487
[58] Field of Search ................ 235/472, 462, 463, 487

[56] References Cited

U.S. PATENT DOCUMENTS 3,978,318   8/1976   Romeo ................................ 235/472

*Primary Examiner*—Harold I. Pitts
*Attorney, Agent, or Firm*—Peter K. Kontler

[57] ABSTRACT

The apparatus serves for rapid recording and processing of orders in gastronomic and similar establishments with input devices at the table for data pertaining to the orders and with a central accepting location for the data pertaining to orders, and should replace heretofore proposed complex table keyboard apparatus whose operation is quite time consuming.

This is accomplished by menus one of which is available at each table and whereon the information pertaining to foods and beverages is associated with bar code patterns, by a reading pencil which is to be actuated by the guest for optical detection of the bar code patterns, and by a check printer which is located at the central accepting location whereby the reading pencil lights up in green color if the order can be fulfilled and lights up intermittently in red when the order cannot be fulfilled.

2 Claims, 1 Drawing Figure

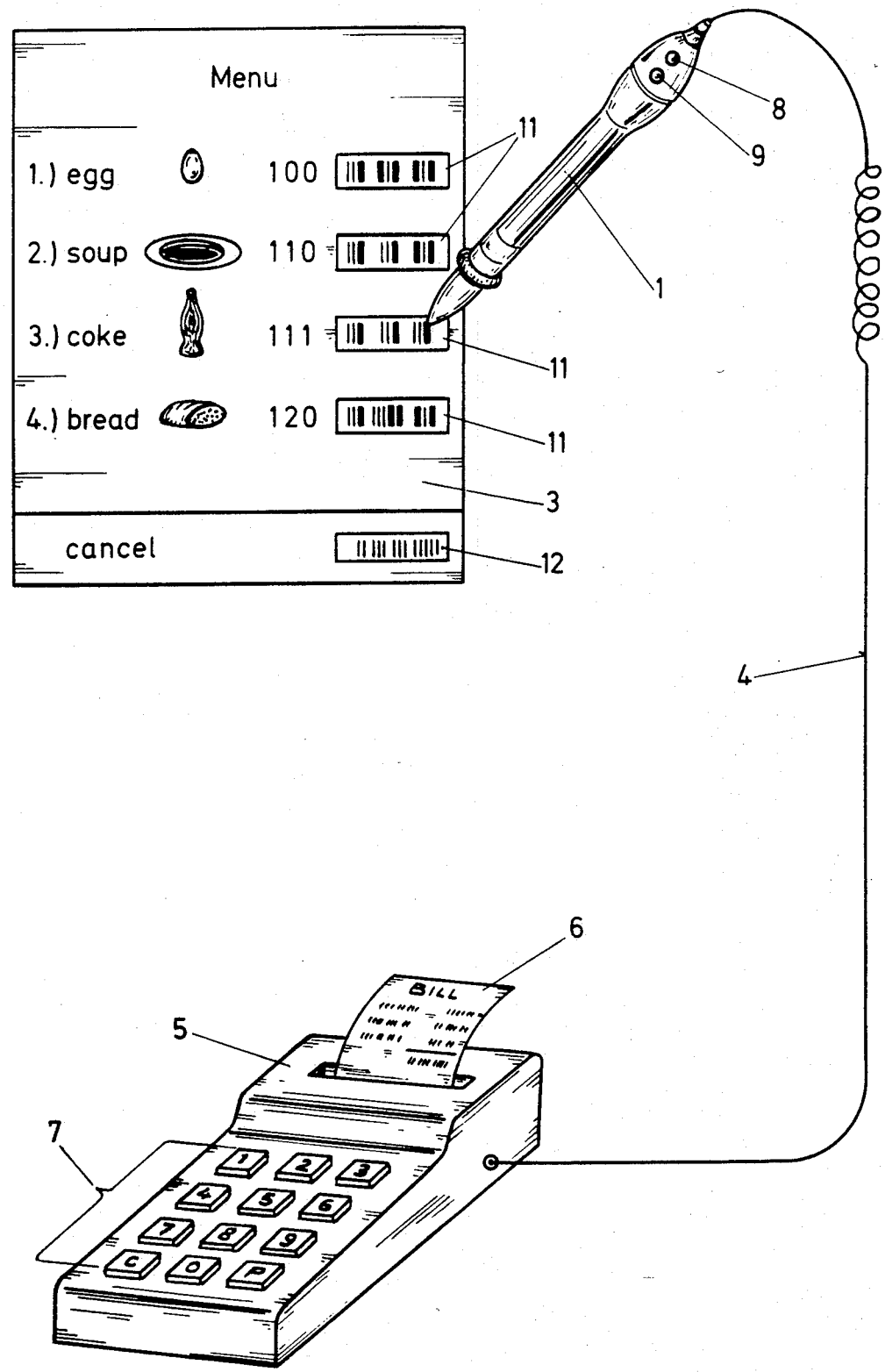

APPARATUS FOR RECORDING AND PROCESSING GUEST ORDERS IN RESTAURANTS OR THE LIKE

BACKGROUND OF THE INVENTION

The invention relates to an apparatus for recording and processing orders in gastronomic and similar establishments with input arrangements for order-identifying data at the tables and with a central accepting station for order-identifying data.

In gastronomic establishments which are known all over the world, there exists a pronounced difference between servicing restaurants with personal service and self-service restaurants wherein the guest who is to be served cooperates to the greatest possible extent. For example, German Offenlegungsschrift No. 26 46 132 makes a proposal which is intended for self-service restaurants but, owing to its complexity, has failed to gain acceptance in actual practice.

OBJECTS AND SUMMARY OF THE INVENTION

In accordance with this proposal, an apparatus with keys which light up in diverse bright and matte colors is to be placed onto each table of a restaurant and is to be operated by the guest, with resort to a specially designed menu, in a predetermined manner so that the ordering procedure and payment can be carried out in a more expeditious way.

An individual who is to actuate this proposed keyboard, and who desires to order a single course, is required first to depress a specific seat-meal sequence key which takes into consideration the own seat in one row of keys and the one type of a series of types of foods in another row of keys. In the next step, it is necessary to locate the order number of the desired course. The key denoting the ascertained order number must then be depressed in the order number keyboard. Thus, the ordering of a course for an individual necessitates the depression of two different keys and the selection of a given order number in the menu.

However, if the individual in question would desire to order three courses plus a beverage, this necessitates the depression of eight different keys and repeated search for order numbers, i.e., a total of twelve operations. Accordingly, if a family father is to act as the person who would like to place orders for a four-member family, he must carry out a total of 48 operations.

Thus, this proposal does not bring about any advantages in a sense to accelerate the ordering but, on the contrary, establishes artificial obstacles to prompt ordering and makes unreasonable demands upon the ability and willingness of the guest to cooperate at own initiative which would require sobering concentration and office-like work. In addition, the setting up of input keyboard apparatus is optically disturbing and space-consuming.

An object of the invention is to design the conventional apparatus with a view to greatly enhance the simplicity of its operation.

In accordance with the invention, this object is accomplished by the provision at each table of a menu with a plurality of bar code patterns associated with the courses or beverages to be ordered, in that a reading pencil is available at each table for optical scanning of the bar code pattern, and that each such pencil is provided with an activating key and an indicating device which lights up in green color when the reading pencil scans a code pattern if the establishment can fulfill the order and which intermittently lights up in red color if the establishment is incapable of fulfilling the order, and in that the central accepting location utilizes a check printer.

The menu is preferably provided with a special bar code which allows for complete erasure of previously placed orders.

Thus, the apparatus allows for a pronounced acceleration of ordering and computing procedures in a gastronomic establishment. The guest merely handles the menu, grasps the reading pencil which is available at the table, activates the pencil, and guides the pencil over those bar codes which are associated with data pertaining to desired foods and beverages.

Since, in the course of such operation, the reading pencil lights up in green color when there is a willingness on the part of the kitchen to fulfill the order, the guest knows that the thus placed order has been recorded and will be fulfilled. If the kitchen is unable to deliver certain foods and beverages, the kitchen personnel must depress corresponding keys at the central accepting location which thereupon causes the reading pencil that is being guided over the thus "blocked" bar code to light up intermittently in red rather than in green color.

Consequently, when the guest moves the reading pencil over a thus "blocked" bar code and notes that the reading pencil which, up to such time, was lighted in green color, switches to an intermittent red signal in the course of such action, the guest learns that this order is blocked and cannot be fulfilled. The guest will thereupon automatically switch to a substitute order so that the reading pencil again lights up in green and the guest is again assured that the ordering operation is taking a regular positive course.

It is not even necessary that the guest turn off the reading pencil upon completion of such ordering procedure which is carried out in the aforedescribed simple manner. It suffices that the green control light be automatically turned off after a certain interval of time. It is important that such automatic turning off furnish an impulse for the printer at the central accepting location so as to start with the printing of checks. In this manner, the ordering and check-preparing operations are completed rapidly and unequivocally, and the gastronomic establishment in question must merely employ unskilled labor for the delivery of ordered goods from the kitchen to the guest table.

BRIEF DESCRIPTION OF THE DRAWING

The single FIGURE of the drawing is a front elevational view of a menu which is provided with bar codes for each listed item on the menu and with a special bar code, and further showing the pencil and the check printer.

DESCRIPTION OF THE PREFERRED EMBODIMENTS

The drawing shows a menu 3 which lists a series of edible items and beverages each of which is adjacent to a discrete bar code 11. An additional special bar code 12 is provided in the bottom region of the menu 3 to allow for erasure of all previously placed orders, either by a guest or by a waitress or waiter.

A reading pencil 1 is provided on each table of the establishment and a cable 4 connects the pencil with a check printer 5 in the kitchen of the establishment. The printer automatically makes entries on a check 6 in response to signals which are received from selected bar codes 11. The check printer 5 further comprises a keyboard 7 with twelve keys (numerals 0 to 9 and function keys C and P).

For example, if a member of the kitchen personnel depresses the key with the numeral "1" thereon three times in a row and thereupon depresses the key "C" (cancel), the terminal including the printer 5 receives information that the corresponding item (a soft drink shown on the menu 3) is not available, and such information is conveyed via cable 4 to the pencil 1 on which a source 9 emits an intermittent signal (red light) to indicate to the guest that the soft beverage denoted by the numeral 111 and the corresponding bar code 11 is not available. Such intermittent red signal is generated when the guest moves the tip of the pencil 1 across the bar code 11 denoting the item 111.

If a member of the kitchen personnel depresses the key with the numeral "1" (once) and the key with the numeral "0" (twice), and thereupon depresses the key "P" (price), the printer 5 will change or reconfirm the cost of the egg (item 100) on the menu 3.

The reference character 8 denotes a source of green light which is provided on the pencil 1. As mentioned above, the source 9 begins to emit red light if the guest causes the tip of the pencil 1 to pass over a bar code 11 adjacent to an item which is not available. When the source 8 emits green light while the tip of the pencil passes over a bar code, the cable 4 transmits a signal which causes the printer 5 to print the cost of the selected item or items on the bill 6.

Reading pencils of the type capable of being used in the arrangement of the present invention are disclosed, for example, in U.S. Pat. No. 3,978,318 and in German Auslegeschrift No. 2,320,952.

I claim:

1. Apparatus for ascertaining and computing orders in gastronomic and similar establishments with input devices for data pertaining to the orders at the tables and with a central accepting location for the data pertaining to orders, characterized by the provision at each table of a menu with a plurality of bar code patterns which are associated with the foods or beverages to be ordered, in that a reading pencil is available at each table for optical scanning of the bar code patterns, each such pencil being provided with an activating key and an indicating device which, after scanning of a code pattern with the reading pencil, lights up in green color if the order can be fulfilled by the establishment and which intermittently lights up in red color if the order cannot be fulfilled by the establishment, and in that a printer for checks is provided at the central accepting location.

2. Apparatus according to claim 1, characterized in that the menu is provided with a special bar code which allows for total erasure of all previously introduced orders.

* * * * *